(12) United States Patent
Osborn

(10) Patent No.: US 6,346,561 B1
(45) Date of Patent: Feb. 12, 2002

(54) PAVEMENT MATERIAL

(75) Inventor: John D. Osborn, Port Bolivar, TX (US)

(73) Assignee: Texas Encore Materials, Inc., Ft. Lauderdale, FL (US)

( * ) Notice: Subject to any disclaimer, the term of this patent is extended or adjusted under 35 U.S.C. 154(b) by 1 days.

(21) Appl. No.: 09/626,664

(22) Filed: Jul. 27, 2000

Related U.S. Application Data

(63) Continuation-in-part of application No. 08/677,697, filed on Jul. 10, 1996, now abandoned, which is a continuation-in-part of application No. 08/391,386, filed on Feb. 21, 1995, now Pat. No. 5,604,277, which is a continuation of application No. 08/227,017, filed on Apr. 13, 1994, now Pat. No. 5,488,080, which is a continuation of application No. 07/886,338, filed on May 20, 1992, now abandoned.

(51) Int. Cl.$^7$ .............................................. C08L 95/00
(52) U.S. Cl. ..................... 524/59; 521/40.5; 521/41; 521/43; 521/43.5; 521/44; 524/64; 524/66; 524/68; 524/71; 524/270; 524/274; 524/313; 524/322

(58) Field of Search ................................ 524/59, 64, 66, 524/68, 71, 270, 274, 313, 322; 521/40.5, 41, 43, 43.5, 44

(56) References Cited

U.S. PATENT DOCUMENTS 4,437,896 A * 3/1984 Partanen ....................... 524/59

FOREIGN PATENT DOCUMENTS

RU          852917       * 8/1981       ................... 524/59

* cited by examiner

*Primary Examiner*—Peter Szekely
(74) *Attorney, Agent, or Firm*—David M. Ostfeld

(57) ABSTRACT

The present invention is a recipe and method for combining Gilsonite and other asphaltites with curative elastomers that are powder granular form and which are added to asphalt. Second recipe and method is disclosed to create a dry liquid concentrate comprised of cured elastomers in combination with tall oil or other fatty acids and may also include Gilsonite to be added to asphalt.

27 Claims, No Drawings

PAVEMENT MATERIAL

CROSS REFERENCE TO RELATED APPLICATIONS

This application is a continuation-in-part of U.S. application Ser. No. 08/677,697, filed Jul. 10, 1996, now abandoned entitled Improved Pavement Material which is a continuation-in-part of U.S. application Ser. No. 08/391,386, filed Feb. 21, 1995, entitled Rubber and Plastic Bonding, which is now U.S. Pat. No. 5,604,277, issued Feb. 18, 1997, which is a continuation of U.S. appl. Ser. No. 08/227,017, filed Apr. 13, 1994 now U.S. Pat. No. 5,488,080, issued Jan. 30, 1996, entitled Rubber and Plastic Bonding which is a continuation of U.S. Ser. No. 07/886,338, Filed May 20, 1992, now abandoned. These are incorporated herein by reference.

BACKGROUND OF THE INVENTION

1. Field of the Invention

The present invention relates to the utilization of a post vulcanized rubber crumb combined with asphaltites to modify the physical performance of asphalt. More particularly, the invention relates to additives to the rubber crumb and asphaltite combination.

2. Description of the Prior Art

The utilization of post vulcanized rubber crumb, derived from the processing of scrap automobile and truck tires, to modify asphalt pavements has been common for a number of years. The general terminology used by the Federal Highway Administration, "FHWA", for crumb rubber modifiers is "CRM." Crumb rubber differs from other elastomers or polymers, used to modify asphalt, in that crumb rubber is vulcanized or crosslinked (the process forms irreversible chemical bonds) prior to use. "CRM" is incorporated into asphalt pavements by either a wet or dry process.

The "wet" process combines the rubber crumb with the asphalt binder under heat and agitation until reacted or digested and dispersed, prior to the addition of aggregates. The "dry" process typically specifies a high Natural Rubber, "NR," content in the crumb rubber which often eliminates scrap automobile tires from use. Of the two processes the "wet" method is in wider use.

The "dry" process has produced pavements that tend to ravel and seems to have lost favor with highway engineers. The "wet" process is dependent on a heat induced reaction (digestion) of the crumb rubber into the asphalt. The crumb rubber particle surface area, grade of asphalt, temperature, and even rubber particle dispersion effect the distinct characteristics of resultant "CRM" pavement.

The "wet" process can be divided into two prevalent methods. The "Arizona Design" using a 10-mesh and smaller rubber particle normally of high "NR" content, which has been ambiently processed. The "Arizona Design" batch blends the crumb rubber with asphalt, at 375–425° F., until a gel of required viscosity is formed (typically one hour). The gel has a pot life determined by a lessening of viscosity as the rubber particles decompose.

The newer "wet" method is the "UltraFine Florida" process which uses 80 mesh and smaller rubber particles of high "NR" content, typically processed by wet grinding. The "UltraFine" process tends to use lesser content of crumb rubber and may be blended at the asphalt terminal.

The purpose of adding crumb rubber to asphalt in pavement applications is to enhance the asphalt binder's elastomeric properties thereby improving resistance to stress cracking, thermal cracking, reflective cracking, rutting and general pavement durability. In general "CRM" pavements have performed poorly in pavement stability and have required a higher asphalt binder content. Even though use is motivated by political mandates, "ISTEA" public law (102–240) Dec. 18, 1991, "CRM" pavements have had limited industry success. This lack of success relates directly to cost, performance and difficulty of use.

Gilsonite (unintaite), Glance Pitch and Grahamite are natural occurring hydrocarbon substances characterized by a high softening point (above 110° C.) in the class known as asphaltites. They are mined much like other minerals and sold essentially in their native state. They are fully compatible with asphalt and have long been known as asphalt hardeners and reinforcing agents. Gilsonite is currently sold all over the world as an asphalt modifier in the form of a dry bulk solid granular powder.

Gilsonite's benefits to asphalt pavements include increased stability, resistance to deformations problems such as rutting and shoving, resistance to water striping and increased load bearing ability. Gilsonite functions by making the pavements harder, stronger and increases asphalt's adhesion to aggregates. It is generally regarded that Gilsonite reduces pavements' low temperature properties making them susceptible to thermal cracking.

Gilsonite melted into hot asphalt will reduce penetration and increase viscosity of the asphalt binder. Gilsonite may also be mixed with aggregate prior to combining with the asphalt binder. Gilsonite modified asphalt pavements have been particularly successfully in highly stressed traffic areas. Gilsonite, as the majority constituent, has been combined with virgin polymers such as styrene-butadiene-styrene (SBS) and Ethyl Vinyl Acetate (EVA). Gilsonite modified asphalt binders generally do not increase asphalt binder content requirement in pavement mixtures.

Performance grading of asphalt binders and pavement mixtures became a reality with the conclusion of the, "FHWA" 50 million dollar, Strategic Highway Research Program, "SHRP", in March of 1993. "SHRP" developed new asphalt binder specifications and test criteria based on the engineering properties related to pavement performance. The new emphasis is on low temperature performance of aged binder materials. Low temperature flexibility of aged asphalt binders became significant. Performance Grade "PG," asphalt is based on the predicted temperature performance both high and low of asphalt binders. Neither Gilsonite nor post vulcanized crumb rubber have performed well under "SHRP" evaluations. "SHRP" specifications will cause increased demand for modified asphalt as state departments of transportation adopt the "PG" specifications.

It is well-known in the art to use tall oil with ground rubber waste for reuse as rubber. See "Ground Rubber Waste—A Supplementary Raw Material for the Rubber Industry" issued by Kahl & Co.; U.S. Pat. No. 4,481,335, issued Nov. 6, 1984 to Stark, Jr. entitled "Rubber Composition and Method"; U.S. Pat. No. 3,873,482, issued Mar. 25, 1975 to Severson et al, entitled "Pyrolyzed Tall Oil Products as Synthetic Rubber Tackifiers"; U.S. Pat. No. 4,895,911, issued Jan. 23, 1990 to Mowdood et al, entitled "Tall Oil Fatty Acid Mixture in Rubber"; U.S. Pat. No. 4,792,589, issued Dec. 20, 1988 to Colvin et al, entitled "Rubber Vulcanization Agents of Sulfur and Olefin"; and U.S. Pat. No. 4,244,841, issued Jan. 13, 1981 to Frankland, entitled "Method for Recycling Rubber and Recycled Rubber Product". Generally for the area of ground polymer elastomer operation, see U.S. Pat. No. 4,771,110, issued Sep. 13, 1988 to Bouman et al, entitled "Polymeric Materials Having Controlled Physical Properties and Purposes for Obtaining These"; and for rubber discussions see U.S. Pat. No. 3,544, 492, issued Dec. 1, 1970, to Taylor et al, entitled "Sulfur Containing Curing Agents"; and "Organic Chemistry" by Fieser and Fieser printed 1944 by D.C. Heath & Co. Boston, pages 346 and 347. See also U.S. Pat. No. 2,082,607, issued Sep. 1, 1936 to Cowdery, entitled "Rubber Compounding Material and Method of Using" and U.S. Pat. No. 2,133,690, issued Oct. 13, 1938 to Epstein, entitled "Rubber and Method of Making the Same".

SUMMARY OF THE INVENTION

The present invention is a recipe and method for combining Gilsonite or other asphaltites with post vulcanized (cured) elastomers which have been further processed by ambient or cryogenic or wet grinding into powder or granules. The resulting mixture is designed to modify the physical performance characteristics of asphalt or bitumen (technically "bitumen" is used to denominate raw material heavy portions of crude oil, but in the Gilsonite industry "asphalt" and "bitumen" are used interchangeably) used in industrial, consumer and road pavement applications. The invention further discloses the recipe and method to create a Dry Liquid Concentrate, "DLC" comprised of post vulcanized (cured) elastomers processed by ambient or cryogenic grinding into powder or granules and tall oil, tall oil heads, tall oil pitches, residues of tall oil production and other fatty acids which enhances the post vulcanized rubber powder or granules effectiveness in the invention.

The preferred asphaltites are characterized by their high softening points above 110° C. and include Gilsonite (uintaite), Glance Pitch and Grahamite.

Post vulcanized crosslinked elastomer(s) which have been further processed by ambient or cryogenic or wet grinding into cured rubber granules or powder forms a primary component of the mixture. The cured rubber particles used are of natural or synthetic rubber, or combination thereof, which has been substantially vulcanized or cured, as in the manufacture of automobile or truck tires. Scrap tires, including but not limited to, automobile and truck tires constitute a primary source of available, useful cured rubber particles. With respect to scrap tires as a source of cured rubber particles the mixture is equally effective with crumb rubber generated either from the side wall or tread of scrap automobile or truck tire carcasses. Common rubbers useful to the invention include, but are not limited to: NR, SBR, isoprene, neoprene, nitrile, butyl and ethylene-propylene dien rubbers. There is no need to separate the rubbers by polymer content.

The preferred Dry Liquid Concentrate, "DLC", is a homogeneous or unitofrm blend or combination or mixture of tall oil, tall oil heads, tall oil pitches, residues of tall oil production, or other fatty acids, post vulcanized elastomer(s) which have been processed into granules or powder (i.e., crumb rubber) and converting vulcanized crumb rubber into the DLC by absorption by the crumb rubber of such, for example, tall oil agents or other fatty acids, and then by mixing with Gilsonite or other asphaltites becomes an asphaltite reinforced DLC. The preferred Dry Liquid Concentrate, "DLC", is a homogeneous or uniform blend or combination or mixture of tall oil, tall oil heads, tall oil pitches, residues of tall oil production, or other fatty acids, and post-vulcanized elastomer(s) which have been processed into granules or powder (i.e. crumb rubber) and converts vulcanized crumb rubber in the DLC by absorption by the crumb rubber of such, for example tall oil agents or other fatty acids. The "DLC" enhances the performance capabilities of this invention by accelerating the heat blending cycle of the crumb rubber with asphalt or bitumen, thereby reducing the cost of blending equipment, reducing required energy and allowing the invention to be employed on either the aggregate or asphalt side of a pavement mixture.

The mixtures disclosed in this invention substantially modify the temperature performance, both high and low, as well as increase the durability of asphalt pavement mixtures.

DESCRIPTIONS OF THE PREFERRED EMBODIMENT(S)

This invention discloses a recipe, including vulcanized (cured) rubberparticles and Gilsonite or other asphaltites, combined into a bulk solid mixture used to substantially increase the temperature performance (both high and low) of asphalt or bitumen. Further disclosed are the ingredients and method to enhance the usefulness of the invention by converting the vulcanized crumb rubber and asphaltites into a free flowing granular solid alphaltite reinforced Dry Liquid Concentrate "DLC". The asphaltite reinforced "DLC" exhibits a greatly accelerated digestive cycle in asphalt or bitumen thereby reducing the cost and energy required for use, as well as significantly improves modified asphalt binder durability in asphalt pavement mixtures.

Post vulcanized crosslinked elastomer(s) which have been further processed by ambient or cryogenic or wet grinding into cured rubber granules or powder forms a primary component of the mixture. The cured rubber particles used are of natural or synthetic rubber, or combination thereof, which has been substantially vulcanized or cured, as in the manufacture of automobile or truck tires. Scrap tires, including but not limited to, automobile and truck tires constitute a primary source of available, useful cured rubber particles. With respect to scrap tires as a source of cured rubber particles, the mixture is equally effective with crumb rubber generated either from the sidewall or tread of scrap automobile or truck tire carcasses. Common rubbers useful to the invention include, but are not limited to: NR, SBR, isoprene, neoprene, nitrile, butyl and ethylene-propylene dien rubbers (EPDM). There is no need to separate the rubbers by polymer content. It is desirable, but not required, for the crumb rubber to be substantially dry with a moisture content of less than 1%. The crumb rubber particles should be substantially free of contaminants such as steel and fiber. The rubber particle mesh sizes useful to this invention range in general from about 10 mesh to 400 mesh with a preferable range of 40 mesh to 400 mesh and mesh ranges 80–400 mesh are desirable.

The second component of the mixture is Gilsonite (uintaite) [12002-43-6] a natural hydrocarbon substance of the class known as asphaltites, occurring as a coal-like solid which is mined much like other minerals and sold essentially in its native state. Gilsonite is classed as one of the asphaltites, which are natural asphalt like substances, characterized by their high softening point (above 110° C.). Glance Pitch and Grahamite are other preferred members of the class of asphaltites, some properties of which are shown in Tables 1 and 2.

TABLE 1

Properties of Gilsonite, Glance Pitch, and Grahamite

| Mineral | Streak | Specific gravity at 25° C. | Softening point, ring and ball method. ° C. | Fixed carbon[a], % |
|---|---|---|---|---|
| gilsonite or uintaite | brown | 1.03–1.10 | 132–190 | 10–20 |
| glance pitch or manjak[b] | black | 1.10–1.15 | 132–190 | 20–35 |
| grahamite[b] | black | 1.15–1.20 | 188–329 | 35–55 |

[a]By proximate analysis, as for coal.
[b]When substantially free from mineral matter.

TABLE 2

2. Properties of Gilsonite[a]

| Property | Value |
|---|---|
| color in mass | black |
| color of streak or powder | brown |
| fracture | conchoidal |
| specific gravity, 15/15° C. | 1.04 |
| softening point (ring and ball method), ° C. | 160 |
| bitumen soluble in carbon tetrachloride, % | 99.8 |
| behavior in petroleum solvents | liquid solution that may thicken slightly upon standing |
| flash point, COC[b], ° C. | 315 |
| heating value, kJ/g[oc] | 41.8 |
| specific heat, J/kg[oc] | |
| at 149° C. | 2180 |
| at 260° C. | 2550 |
| thermal coefficient of expansion (volumetric), per ° C. | 0.0005 |
| viscosity (Brookfield viscometer), mPa-s (= cP) | |
| at 260° C. | 500 |
| at 288° C. | 250 |
| at 316° C. | 140 |
| volatility (5h), wt % | |
| at 163° C. | <2 |
| at 204° C. | <4 |
| at 260° C. | <6 |
| volatile combustible matter, by ASTM D 271-4 for VCM in coal, % | 75–80 |
| Ultimate analysis, wt % | |
| carbon | 85 |
| hydrogen | 10 |
| nitrogen | 2.5 |
| oxygen | 1.5 |
| sulfur | 0.3 |
| silicon, nickel and trace elements | 0.2 |
| solid paraffins (unsulfonated residue) | 0–trace |
| hardness (Mohs scale) | 2 |
| penetration, 100 g, 5 s, mm/10 | |
| at 25° C. | 0 |
| at 46° C. | 0 |
| at 66° C. | 1 |
| at 77° C. | 2 |
| resistivity, Ω · m | $1.9 \times 10^{10}$ |
| acid value[d] | 2.3 |
| diazo reaction[e] | none |
| saponifiable matter | trace |
| constituent analysis, wt. % | |
| asphaltenes | 50–65 |
| resins | 35–45 |
| oils | 1–5 |

[a]American Gilsonite Selects
[b]Cleveland open cup
[c]To convert J to cal. divide by 4.184
[d]mg KOH/g substance to give pH 7
[e]Color reaction to determine presence of phenols
**Source for Tables 1 & 2 -- ENCYCLOPEDIA OF CHEMICAL TECHNOLOGY, Volume 11, Third Edition © 1980 John Wiley & Sons, Inc. pg. 803–804.

The particle mesh size of the Gilsonite or other asphaltites component of this mixture ranges generally from 10 to about 400 mesh. The Gilsonite or other asphaltites is preferred, but not required, to be substantially dry with a moisture content of less than 1%.

The third component of the invention which substantially increases the usefulness of the mixture by accelerating the heat agitation blend cycle is Tall Oil, Residues of Tall Oil production, Tall Oil Pitches and other fatty acids. Tall oil agents may be any of Unitol DP-5 available from Union Camp Corporation, NEO-SPANGOL T20 available from Kahl & Co. and other formulations comprising tall oil, tall oil heads, tall oil pitches and other fatty acids within the following ranges of characteristics:

| | |
|---|---|
| Viscosity, (centistokes at 99° C.) | 10–1,000 |
| Acid Number (Total) | 15–330 |
| Saponification Number | 10–350 |
| Fatty Acids % | 5%–100% |
| Rosin Acids % | 0%–70% |
| Unsaponifiables % | 5%–80% |

The disclosed tall oil agents and other fatty acids, when used in the invention, are first combined with the crumb rubber and allowed time for absorption prior to combining the Gilsonite or other asphaltites yielding a free flowing granular solid asphaltite reinforced Dry Liquid Concentrate. The tall oil component is desired, but not required, to be substantially dry with moisture of less than one percent.

The present invention, a dry blend of Gilsonite or other asphaltites, with post vulcanized scrap tire generated crumb rubber particles, as a performance modifier for bitumen or asphalt is easily produced by a dispersion mixing system such as a ribbon blender. Mixing can be accomplished at ambient temperature. Mixing should be continued until an even dispersion of ingredients is obtained. The resulting mixture is comprised of a general by weight percentage of from 5% to 45%, more preferably, from 10% to 40% and most preferably from 15% to 35% of Gilsonite or other asphaltites. The preferred particle mesh range for both crumb rubber and Gilsonite or other asphaltites is from 10 mesh to 400 mesh depending on application, desired effect and base asphalt properties. To use this form of the invention the mixture is added to hot bitumen or hot asphalt inblending tanks capable ofmaintaining general temperature ranges of from 250 ° F. to 400° F. or preferably from 300° F. to 360° F.

Blending tanks require adequate agitation to maintain suspension of the crumb rubber during the blending cycle. The blending cycle should be maintained until peak viscosity is obtained (typically 1 hr depending on temperature). Then the modified asphalt may be used. Heat and agitation should be maintained until the blending tank is emptied. Prolonged exposure to the heat and blending cycle will cause a decomposition of the crumb rubber particles and the modified asphalt's viscosity will decrease yielding reduced performance of the modified asphalt. The anticipated weight ranges of the components for crumb rubber and Gilsonite or other asphaltites are as follows:

| Vulcanized Crumb Rubber | 95% to 55% |
|---|---|
| Gilsonite or other asphaltites | 5% to 45% | with appropriate changes in range of the vulcanized crumb rubber for more preferable ranges of the Gilsonite or other asphaltites as set out above.

As set out above, this invention's functional use ability is increased by converting the crumb rubber to a Dry Liquid Concentrate by first blending the crumb rubber with Tall Oil, Residues of Tall Oil production, Tall Oil Pitches or other fatty acids. Tall oil agents may be any of Unitol DP-5 available from Union Camp Corporation, NEO-SPANGOL T20 available from Kahl & Co. and other formulations comprising tall oil, tall oil heads, tall oil pitches and other fatty acids within the following ranges of characteristics which may be used in "DLC":

| Viscosity, (centistokes at 99° C.) | 10–1,000 |
|---|---|
| Acid Number (Total) | 15–330 |
| Saponification Number | 10–350 |
| Fatty Acids % | 5%–100% |
| Rosin Acids % | 0%–70% |
| Unsaponifiables % | 5%–80% |

The Dry Liquid Concentrate, "DLC", is comprised of a uniform mixture of vulcanized crumb rubber and the above described tall oil/fatty acid components. The "DLC's" primary component is the post vulcanized rubber crumb which comprises by a weight percentage of from 55% to 95% or preferably from 70% to 90% of the "DLC" with the tall oil agent or other fatty acid comprising substantially the rest. Mixing of the rubber particles with the tall oil agents is best accomplished by a dispersion mixing system such as a ribbon blender; mastication is not required. Blending of the vulcanized crumb rubber with the tall oil agents can be done at ambient temperature, however pre- warming the rubber particles to approximately 180° F. and then introducing the chemical agents, such as the tall oil formulations at 200° F. provides the fastest mixing cycle. The Gilsonite or other asphaltites may be added after the crumb rubber absorption of the tall oil agents or other fatty acids, but prior to discharging the mixer, yielding a single mix process. The resulting asphaltite reinforced Dry Liquid Concentrate comprised of crumb rubber, tall oil, other fatty acids, residues of tall oil production, Gilsonite, or other asphaltites yields a free flowing granular solid powder. Weight components useful to this invention range as follows:

| Tall Oil Agent/Fatty Acid Component | 4.75% to 24.75% |
|---|---|
| Vulcanized Crumb Rubber | 90.25% to 30.25% |
| Gilsonite or other asphaltites | 5.00% to 45.00% |

The conversion of the vulcanized crumb rubber particles to the described "DLC" substantially accelerates the typical heat digestion cycle of vulcanized crumb rubber particles (as determined by peak viscosity) with bitumen or asphalt, even if no Gilsonite or other asphaltites is added. This accelerated digestive cycle enables the elimination of the expensive blending equipment, reduction of energy required to digest crumb rubber in asphalt, lowers VOC emissions and allows effective use of a vulcanized crumb rubber based asphalt performance modifier to be introduced into either the binder or aggregate portions of asphalt pavement mixtures.

APPLICATION

Asphalt is used in a wide variety of industrial applications. These include, but are not limited to, highway construction, roofing products and emulsions used as consumer grade and industrial grade sealants. The performance modification of asphalt relates to increasing a base asphalt's high temperature stability as well as low temperature flexibility. This invention substantially and unexpectedly increases the performance of either Gilsonite or other asphaltites or vulcanized crumb rubber used independently as an asphalt cement modifying agent. The asphalt modifying effect of this invention is determined by the initial properties and grade of the non-modified asphalt, the crumb rubber particle surface area and the by weight percentage of the crumb rubber/Gilsonite/Tall oil/fatty acid agent used with the asphalt or bitumen. The modifying effect is also adjustable by varying the specific crumb rubber/Gilsonite/tall oil/fatty acid agent ratio in this invention. The general weight range of use for this invention with asphalt is from 5% to 45% of the asphalt or bitumen.

SHRP BINDER EVALUATION RESULTS

In March 1993 the "Strategic Highway Research Program, "SHRP" was concluded. A major part of this research effort was the development of SHRP Performance Graded (PG) Asphalt Binder Specification. A copy of this specification is shown in Table 3. "SHRP PG" Asphalt Binder Specifications are based on temperature grading (maximum/minimum) related to anticipated climate. The United States is covered with a Performance Graded system, correlated with the anticipated climate in the region of use. The Performance Grade, "PG", system considers, in degrees Celsius, the seven hottest day mean average and the coldest single day of the year expected at 98% and 50% accuracy. Example, asphalt binder graded PG 52-22 is specified where the seven day mean does not exceed 52° C. and the single day low does not exceed −22° C. "PG" grades are calculated in 6° C. increments for both high and low temperature grading.

TABLE 3

| | PG52 | | | | | | | PG58 | | | | | PG64 | | | | | | PG170 | | | |
|---|---|---|---|---|---|---|---|---|---|---|---|---|---|---|---|---|---|---|---|---|---|---|
| Performance Grade | -10 | -16 | -22 | -28 | -34 | -40 | -46 | -16 | -22 | -28 | -34 | -40 | -10 | -16 | -22 | -28 | -34 | -40 | -10 | -16 | -22 | -28 |
| Average 7-Day Maximum Pavement Design Temperature, °C[a] | >52 | | | | | | | >58 | | | | | >64 | | | | | | >70 | | | |
| Minimum Pavement Design Temperature, °C[a] | -10 | -16 | -22 | -28 | -34 | -40 | -46 | -16 | -22 | -28 | -34 | -40 | -10 | -16 | -22 | -28 | -34 | -40 | -10 | -16 | -22 | -28 |
| Original Binder | | | | | | | | | | | | | | | | | | | | | | |
| Flash Point Temperature, AASHTO T48: Minimum, °C | 230 | | | | | | | | | | | | | | | | | | | | | |
| Viscosity, ASTM D4402[b] Maximum, 3 Pa · S (3000 cP) Test Temperature, °C | 135 | | | | | | | | | | | | | | | | | | | | | |
| Dynamic Shear, SHRP B-003:* G*/sin δ, Minimum, 1.0 kPa Test Temperature at 10 rad/sec, °C | 52 | | | | | | | 58 | | | | | 64 | | | | | | 70 | | | |
| Physical Hardening Index, h[c] | Report | | | | | | | | | | | | | | | | | | | | | |
| Rolling Thin Film Oven Test (AASHTO T 240, ASTM D2872) | | | | | | | | | | | | | | | | | | | | | | |
| Mass Loss, Maximum, % | 1.00 | | | | | | | | | | | | | | | | | | | | | |
| Dynamic Shear, SHRP B-003: G*/sin δ, Minimum, 2.2 kPa Test Temperature at 10 rad/sec, °C | 52 | | | | | | | 58 | | | | | 64 | | | | | | 70 | | | |
| Pressure Aging Vessel Residue (SHRP B-005) | | | | | | | | | | | | | | | | | | | | | | |
| PAV Aging Temperature, °C | 90 | | | | | | | 100 | | | | | 100 | | | | | | 100/(110)[d] | | | |
| Dynamic Shear, SHRP B-003: G*/sin δ, Minimum, 5000 kPa Test Temperature at 10 rad/sec, °C | 25 | 22 | 19 | 16 | 13 | 10 | 7 | 25 | 22 | 19 | 16 | 13 | 34 | 31 | 28 | 25 | 22 | 19 | 34 | 31 | 28 | 25 |
| Creep Stiffness, SHRP B-002:[c] S, Maximum, 300,000 kPa m-Value, Minimum, 0.30 Test Temperature at 60 s, °C | 0 | -6 | -12 | -18 | -24 | -30 | -36 | -6 | -12 | -18 | -24 | -30 | 0 | -6 | -12 | -18 | -24 | -30 | 0 | -6 | -12 | -18 |
| Direct Tension, SHRP B-006: (Not Reqd.) Failure Strain, Minimum, 1.0 & Test Temperature at 1.0 mm/min, °C | 0 | -6 | -12 | -18 | -24 | -30 | -36 | -6 | -12 | -18 | -24 | -30 | 0 | -6 | -12 | -18 | -24 | -30 | 0 | -6 | -12 | -18 |

California Valley AR1000, a poorly performing "SHRP" PG 52-22, asphalt binder was selected as the base asphalt for all graded evaluations. Crumb Rubber, "CR", used was an ambiently produced scrap passenger car tire material including sidewall and tread 100% passing a 40 mesh screen. Dry Liquid Concentrate, "DLC", employed by a weight 90% of "CR" and 10% chemical agent ratio. The by weight ratio of "DLC" used was adjusted to 16.7% to maintain a 15% "CR" content in modified asphalt binder. The following six blends were evaluated:

| SX ID | Modifier | CR % | DLC % | Gilsonite or other asphaltites % |
|---|---|---|---|---|
| GL001-1 | AR 1000 | — | — | — |
| GL001-2 | Gilsonite | — | — | 8% |
| GL001-3 | DLC | — | 16.7% | — |
| GL001-4 | DLC/Gilsonite | — | 16.7% | 8% |
| GL001-5 | CR | 15.0% | — | — |
| GL001-6 | CR/Gilsonite | 15.0% | — | 8% |

All modified samples were prepared at a temperature of 360° F. The blend time was varied to ensure that samples were well digested and had reached maximum performance levels. Optimum viscosity was determined and blending times were as follows:

| SX ID | Blending Time (min) |
|---|---|
| GL001-2 | 10 |
| GL001-3 | 10 |
| GL001-4 | 10 |
| GL001-5 | 120 |
| GL001-6 | 120 |

Crumb Rubber and Dry Liquid Concentrate blending cycles showed significantly different results. See FIGS. III-1 and III-2.

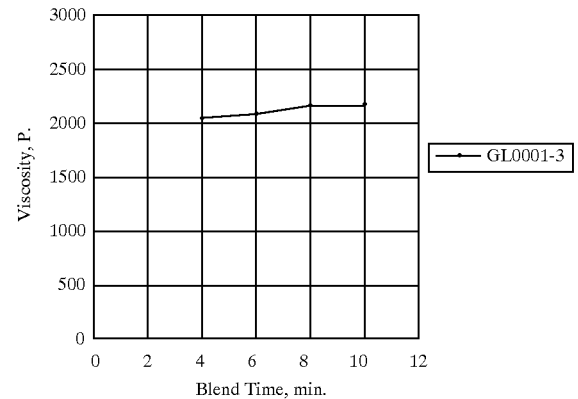

FIG III-1.
Blend Viscosity vs. Blend time for sample GL0001-3.

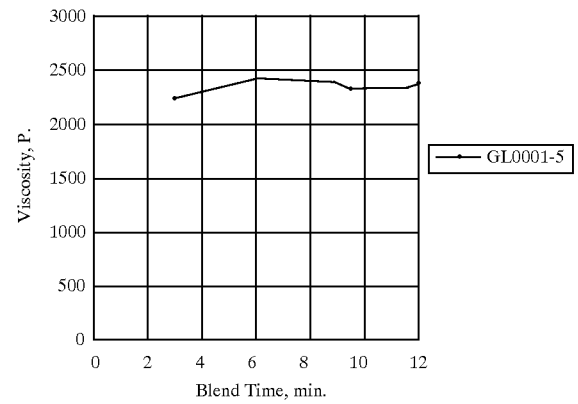

FIG III-2.
Blend Viscosity vs. Blend time for sample GL0001-5.

I. Binder Performance

The AASHTO grading of the blends evaluated in this study are shown in Table III.-1. The AR-1000 fails the PG52-16 because its poor intermediate temperature performance. It is interesting to note that the best blend (GL0001-6) had a performance span of 105.8° C. This is an improvement of 25.1° C. over the base asphalt. This means that the range of grades met was expanded by six grades. This is a very significant improvement. The results are shown schematically in FIG. III.-4.

TABLE III-1

Summary of SHRP performance testing.

| Blend Information | ID # | PG Grading | Tmax | Tmin | Perf. Range, C | Improvement Tmax | Improvement Tmin |
|---|---|---|---|---|---|---|---|
| GL001-1 | 1 | 52-22 | 56.1 | −24.6 | 80.7 | 0.0 | 0.0 |
| GL001-2 | 2 | 58-22 | 63.0 | −21.4 | 84.4 | 6.9 | −3.2 |
| GL001-3 | 3 | 64-28 | 65.6 | −31.8 | 97.4 | 9.5 | 7.2 |
| GL001-4 | 4 | 70-28 | 74.1 | −29.5 | 103.6 | 18.0 | 4.9 |
| GL001-5 | 5 | 64-28 | 66.6 | −31.5 | 98.1 | 10.5 | 6.9 |
| GL001-6 | 6 | 76-28 | 78.4 | −27.4 | 105.8 | 22.3 | 2.8 |

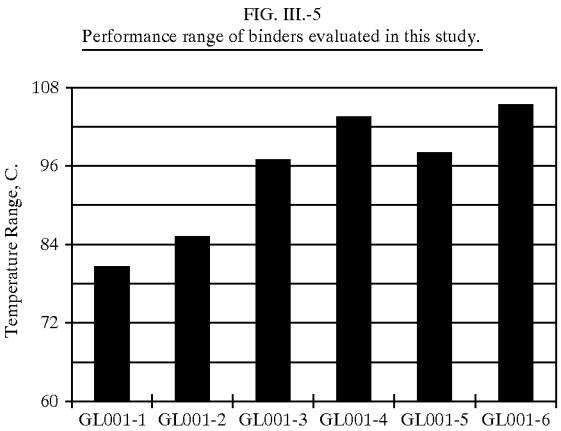

FIG. III.-5
Performance range of binders evaluated in this study.

As shown in FIG. III.-4 below, the improved low temperature properties are solely a result of the oils contained in the crumb rubber. The chemical agents in the "DLC" do not appear to have any measurable effect on the low temperature properties. The Gilsonite or other asphaltites has a detrimental effect on the low temperature properties and raises the low temperatures by 2 to 4° C.

However, the Gilsonite or other asphaltites has a very profound effect on the high temperature properties which outweighs the performance loses on the low temperature side. The Gilsonite alone improves the AR 1000 asphalt's temperature performance by 6.9° C. while the "CR" and "DLC" modified AR 1000 are improved by 10.5 and 8.5° C. Samples using both Gilsonite and "CR" or the "DLC" (GL 001-6 and -4) demonstrate temperature improvements of 22.3 and 18° C. This indicates that there is a synergistic interaction between the Gilsonite or other asphaltites and the "CR"/"DLC".

The performance of the "CR"/Gilsonite or other asphaltites (GL001-6) and the "DLC"/Gilsonite or other asphaltites (GL001-4) are nearly identical. There is a very minor reduction in the high temperature properties in the case of the "DLC"/Gilsonite. This may be attributed to the longer processing time of the "CR"/Gilsonite modifier (i.e. base asphalt aging).

The performance range covered in the different blends is shown in FIG. III-4.

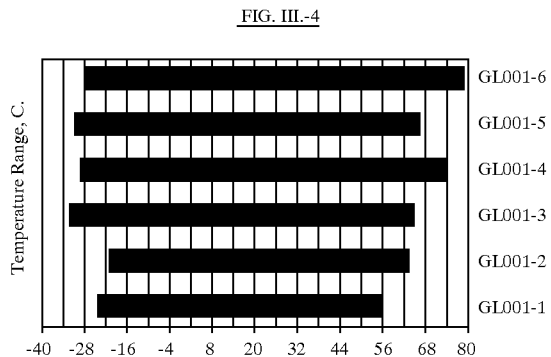

FIG. III.-4

The results of the SHRP Binder evaluation demonstrates an unanticipated synergistic interaction between Gilsonite or other asphaltites and vulcanized crumb rubber, generated from processing scrap tires, when used in combination to expand the temperature performance, both high and low, of asphalt or bitumen. The results further demonstrate that when the described "DLC" is substituted for the crumb rubber, the invention is improved by a significantly shorter blending cycle yielding lower energy consumption, a reduction in potential VOCs, and reduced equipment costs required to use the invention. The use of Gilsonite or other asphaltites in conjunction with crumb rubber is anticipated to yield a modifier universally compatible with various grades of asphalt or bitumen and adjustable by varying the ratio of the components.

II. "SHRP" Pavement Mix Design Results

The new pavement specification resulting from the "SHRP asphalt research program is referred to as "SuperPave", which stands for Superior Performing Asphalt Pavements. "Super Pave", a computer program that assists engineers in mix designs and materials, represents a new improved system of performance specifications yielding more durable asphalt pavements.

"SHRP" Level I Mix Design Tests were conducted on selected modified asphalt binders. The tests were conducted under "SHRP" Super Pave Level I design criteria. Summery of binders tested as follows:

| Binder | SX ID # | SHRP PG Grade |
|---|---|---|
| Base = | | |
| AR 1000 | GL001–1 | 52–22 |
| 8% Gilsonite | GL001–2 | 58–22 |
| 8% Gilsonite/16.7% "DLC" | GL001–4 | 70–28 |
| 15% "CR" | GL001–5 | 64–28 |
| 8% Gilsonite/15% "CR" | GL001–6 | 76–28 |

"SHRP" Level I. Pavement Design Results:

| Pavement Mix | "SHRP" PG Grade | Asphalt Binder % | Va | VFA | "ESALs" (million) |
|---|---|---|---|---|---|
| GL001-2 | PG 58-22 | 4.9 | 4.0 | 13.4 | 12.1 |
| GL001-4 | PG 70-28 | 4.4 | 4.0 | 12.3 | 30.4 |
| GL001-5 | PG 64-28 | 5.2 | 4.0 | 13.7 | 10.8 |
| GL001-6 | PG 76-28 | 5.0 | 4.0 | 13.3 | 15.6 |

The most critical element of these results is the category "ESALs", which refers to "Equivalent Axle Loads", measuring "Predicted Cycles to a 1 cm Rut Depth". "ESALs", are generally regarded to indicate or predict asphalt pavement durability. It can therefore be concluded that though crumb rubber, with optimum heat blending SX GL001-5, increases the "PG" of the base AR 1000 (PG 52-22) to a rating of PG 62-28, "ESAL's", or pavement durability, decreases from 12.1 million in SX GL001-2 (AR 1000+8% Gilsonite) to 10.8 million (–10.7%). Pavements produced from asphalt binders SX GL001-4 and -6 (+Gilsonite+ "DLC"/"CR"), both the "PG"binder grade increased as well as the "ESALs". The mix design using asphalt binder SX GL001-4 showed a remarkable and unanticipated increase (of 151% over SX GL001-2 and 95% over SX GL001-6) in "ESALs" or durability. SX GL001-4 also produced the lowest recommended asphalt binder content, 4.4%, an unanticipated 10.2% decrease over GL001-2, the lowest recommended asphalt binder content of the other modified binders tested. Other terms used in the "SHRP", Level I Mix Design Tests, "Va" refers to air voids in pavement mix and "VMA", voids in mineral aggregate. "SHRP"evaluations show SX GL001-4 (AR 1000+8% Gilsonite+16.7% "DLC") demonstrates an obvious synergism between the ingredients of Tall Oil and other fatty acids, post vulcanized crumb rubber and Gilsonite or other asphaltites, as described in the invention, relating to the temperature and durability of asphalt or bitumen binders and the pavement mixes employment them. Further the "SHRP" evaluations demonstrate that the effectiveness as a asphalt binder modifier is enhanced when Gilsonite or other asphaltites and crumb rubber are used together, as described in the invention, opposed to independently to modify asphalt or bitumen.

It is important to note that the design AC content for GL001-4 modified binder is significantly lower than GL001-2 or GL001-5. The AR1000 modified with Gilsonite and the "DLC" (GL001-4) showed significant improvements at both high and low temperatures, increased rut resistance as well as dramatically shortened heat blending cycle. The resulting mixture (GL001-4) has lower asphalt binder content than other samples tested. The GL001-4 mixture exhibited improved rut resistance and improved cost performance in asphalt pavements.

With regard to weight percentage and mixings, the Gilsonite and elastomer mix, without the tall oil or other fatty acids, should have a weight percent of such mixture to asphalt or bitumen of five percent to forty-five percent, and preferably fifteen percent to thirty five percent with the asphalt comprising the remaining weight percent to reach one hundred percent. With regard to the mixture of Gilsonite or other asphalt types, and cured elastomers and tall oil or other fatty acids, the weight percent of such mixture to asphalt should be in the range of eight percent to forty eight percent and preferably twelve percent to thirty eight percent with the asphalt comprising the remaining weight percent to reach one hundred percent. With regard to mixtures of tall oil or other fatty acids and cured elastomers, the weight percent ratio and of such mixture to asphalt should be in the range of five percent to forty five percent and preferably in the range of ten to twenty five percent with the asphalt comprising the remaining weight percent to reach one hundred percent.

Because many varying and different embodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A dry liquid concentrate mixture for use with asphalt, comprising:
  a. a mixture of:
    1.) cured elastomer
    2.) one or more liquid agents selected from the group consisting of tall oil, tall oil heads, tall oil pitches, residues of tall oil production and other fatty acids, wherein said elastomer absorbs said liquid agent, forming a Dry Liquid Concentrate wherein said elastomer is combined with said liquid agent; and
  b. In addition to said Dry Liquid Concentrate of:
    1.) asphaltite,
wherein such blend of asphaltite, rubber, and liquid agents is pulverulent.

2. The mixture of claim 1, where said cured elastomer is a post vulcanized crumb rubber, said crumb rubber includes cured and shaped rubber particles.

3. The mixture of claim 1 wherein said liquid agent has the following ranges of characteristics:

| | |
|---|---|
| Viscosity, (centistokes at 99° C.) | 10–1,000 |
| Acid Number (Total) | 5–330 |
| Saponification Number | 10–350 |
| Fatty Acids % | 5%–100% |
| Rosin Acids % | 0%–70% |
| Unsaponifiables % | 5%–80% |

4. The mixture of claim 1, wherein said asphaltite is Gilsonite.

5. The mixture of claim 1, wherein said ashpaltite is Glance Pitch.

6. The mixture of claim 1, wherein said asphaltite is Unintaite.

7. The mixture of claim 1, wherein said asphaltite is Grahamite.

8. The mixture of claim 1 having the following weight percent ranges:
liquid agent 4.75–24.75
elastomer 90.25–30.25
asphalite 5.0–45.0.

9. The mixture of claim 2, wherein the moisture content of said rubber particles and liquid agent is not more than 1% by weight.

10. The mixture of claim 2 in which the particle size of the said crumb rubber particles is finer than about 10 mesh.

11. The mixture of claim 2, wherein said crumb rubber is about 55% to 95% by weight of the mixture.

12. The mixture of claim 2, wherein said crumb rubber is about 70% to 90% by weight of the mixture.

13. The mixture of claim 2 in which the particle size of the said crumb rubber particles is finer than about 40 mesh.

14. The mixture of claim 2 in which the particle size of the said crumb rubberparticles is finer than about 80 mesh.

15. The mixture of claim 1, wherein said cured elastomer is crumb rubber, said crumb rubber is ground.

16. The mixture of claim 1, wherein said cured elastomer is crumb rubber, said crumb rubber is granular.

17. The mixture of claim 1, wherein said cured elastomer is crumb rubber selected the group consisting of natural rubber, styrene butadiene rubber, isoprene, ethylene-propylene rubbers, neoprene, nitrile rubber, butyl rubber, and ethylene-propylene diene polymer.

18. A method for preparing a mixture with asphalt, comprising the steps of:
  combining a cured elastomer and one or more liquid agents selected from the group consisting of tall oil, tall oil heads, tall oil pitches, residues of tall oil production and other fatty acids and asphaltite to form an asphaltite reinforced Dry Liquid Concentrate;
  combining such combination with asphalt, such combination occurring by dispersion mixing, wherein the resulting blend is pulse.

19. The method of claim 18, wherein said combining occurs at a temperature between ambient and 250° F.

20. The method of claim 18, wherein said combining occurs at a temperature between ambient and 200° F.

21. The method of claim 18, wherein said cured elastomer is a post vulcanized crumb rubber, said crumb rubber is pre-warmed to a temperature at or below 200° F. before mixing.

22. The method of claim 18, wherein said cured elastomer is a post vulcanized crumb rubber, said crumb rubber is pre-warmed to a temperature at or below 180° F. before mixing.

23. The method of claim 18, wherein said cured elastomer is crumb rubber, said crumb rubber is pre-warmed before mixing with said liquid agent and said liquid agent is added to said crumb rubber at a temperature higher than said pre-warmed crumb rubber.

24. A mixture of asphalt and additives comprising:

asphalt combined with an asphaltite reinforced Dry Liquid Concentrate, said asphaltite reinforced Dry Liquid Concentrate including a mixture of post vulcanized crumb rubber and one or more liquid agents selected from the group consisting of tall oil, tall oil heads, tall oil pitches, residues of tall oil production and other fatty acids, wherein said crumb rubber absorbs said liquid agent, forming a Dry Liquid Concentrate wherein said crumb rubber is combined with said liquid agent; and wherein there is further included an asphaltite combined with the Dry Liquid Concentrate thereby forming the asphaltite reinforced Dry Liquid Concentrate, wherein said asphaltite reinforced Dry Liquid Concentrate is pulverulent.

25. The mixture of claim 24 wherein said asphaltite reinforced Dry Liquid Concentrate has the following weight percent ranges:

| | |
|---|---|
| Liquid agent | 4.75–24.75 |
| crumb rubber | 90.25–30.25 |
| asphaltite | 5.0–45.0 |

26. The mixture of claim 1 having the following weight percent ranges:

| | |
|---|---|
| asphalt | 92–52 |
| Dry Liquid Concentrate | 8–48. |

27. The mixture of claim 1 having the following weight percent ranges:

| | |
|---|---|
| asphalt | 88–62 |
| Dry Liquid Concentrate | 12–38. |

\* \* \* \* \*